April 14, 1953  J. R. CAVE  2,634,959
GAS-LIQUID CONTACT APPARATUS
Filed May 9, 1949  2 SHEETS—SHEET 1

INVENTOR.
JOHN RICHARD CAVE
BY Benjamin J. Kaufman
ATTORNEY

April 14, 1953        J. R. CAVE        2,634,959
GAS-LIQUID CONTACT APPARATUS
Filed May 9, 1949        2 SHEETS—SHEET 2
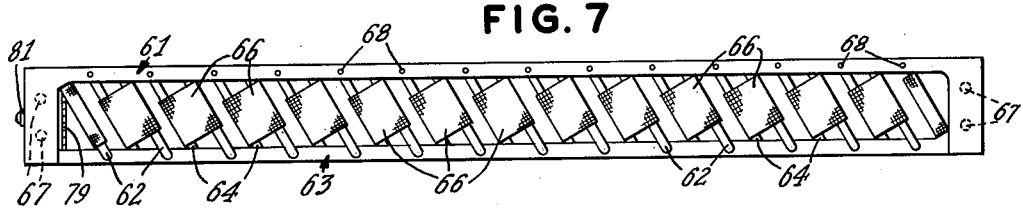
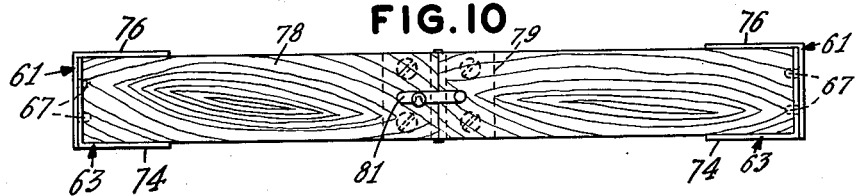
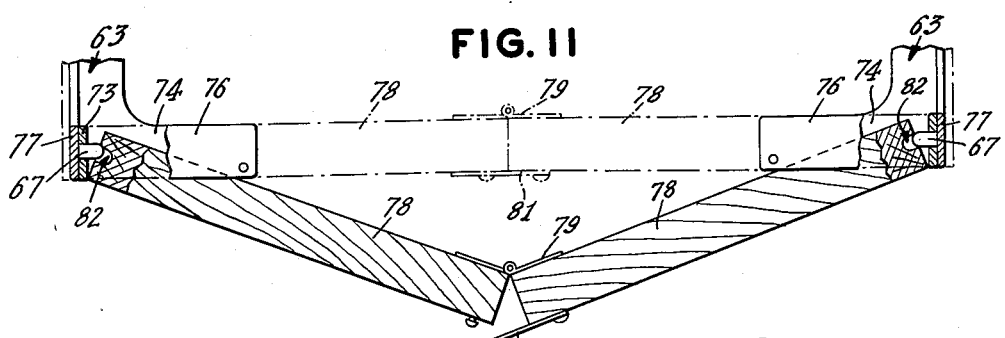
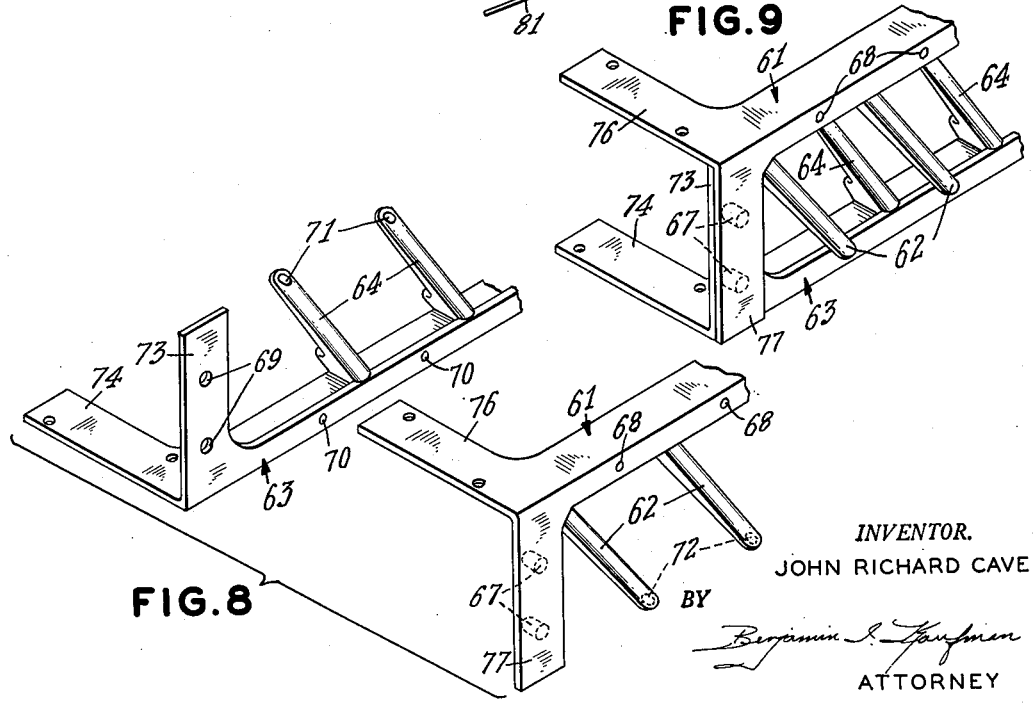
*INVENTOR.*
JOHN RICHARD CAVE
BY
Benjamin I. Kaufman
ATTORNEY Patented Apr. 14, 1953

2,634,959

UNITED STATES PATENT OFFICE 2,634,959

GAS-LIQUID CONTACT APPARATUS

John Richard Cave, Bayside, N. Y.

Application May 9, 1949, Serial No. 92,186

8 Claims. (Cl. 261—24)

This invention relates to fluid contact apparatus. In one aspect this invention relates to apparatus including an improved baffle tray for effecting contact between gases and liquids. In another aspect this invention relates to a new type of construction for baffle trays. In still another aspect the invention relates to apparatus for cooling liquids, particularly for cooling water with a forced draft of air.

Fluid contact apparatus conventionally contains baffles for directing the flow of fluids through the apparatus to obtain the required contact and residence time of the fluids. In the contacting of liquids and gases, a suitable chamber is employed conveniently containing a plurality of superimposed baffle trays. Heretofore, these baffle trays for contacting liquids and gases, such as the cooling of water with air by an induced or forced draft, as employed in conventional water cooling or air conditioning systems, have been constructed of a plurality of uniformly spaced parallel slats, each of which is rigidly and separately fixed within the frame of the baffle tray. The liquid flows over the slats from tray to tray usually in countercurrent contact with an upwardly flowing stream of gases, which flow through the open spaces between the slats whereby intimate contact between liquids and gases is obtained in the contact apparatus. The slats of the baffle tray are ordinarily made of solid rigid material such as strips of wood or metal. These rigid strips or slats are fixed to the sides of the frame of the baffle tray by various conventional means, such as by nailing, bolting, channel recessing and glueing.

The construction of the trays in general, requires a considerable amount of manual labor, since each slat must be separately fixed to the frame. Since the slats are made of rigid materials such as wood or metals, the cost of the slats is an important factor in the overall cost of the baffle trays. In the case of wood slats when employed in systems utilizing water, the wood often becomes warped or swollen to such an extent that the trays must be replaced because of becoming unsuitable for use. The rigid construction, in general, of the slats, whether wood or metal, renders the baffle trays fragile and susceptible to being bent or broken in shipping or during use. It is, therefore, much to be desired to provide an apparatus containing baffle trays which obviates or eliminates these difficulties and disadvantages encountered in the construction of conventional baffle trays.

An object of this invention is to provide apparatus of improved construction for contacting fluids.

Another object of this invention is to provide a new and improved type of baffle tray.

Still another object of this invention is to provide a baffle tray of more economical construction and ease of fabrication than heretofore possible.

Yet a further object of this invention is to provide a baffle tray which permits greatly increased contact surface between liquids and gases than can be obtained with conventional equipment.

Still another object of this invention is to provide baffle trays and slats therefor, fabricated from a new type of construction material for this purpose.

Yet another object of this invention is to provide a new method of fabricating baffle trays containing a plurality of slats.

Numerous other objects and advantages will become apparent to those skilled in the art from the accompanying description and disclosure.

In the drawing:

Figure 1 is an elevational view, partly in cross section, diagrammatically illustrating apparatus for cooling water by a forced draft of air in which the improved baffle trays of the present invention are particularly and advantageously adaptable.

Figure 2 of the drawing is a perspective view diagrammatically illustrating the improved baffle tray 33 of Figure 1, in which the slats are fabricated by winding a flexible material around struts of the side-sections and attaching the ends of the flexible material to the frame.

Figure 7 is an elevational view of the improved baffle tray of this invention in which the side-section of the frame of the tray is constructed of a pair of diametrically disposed comb-like members forming struts or spacing members around which the flexible slat material is wound.

Figure 8 is a perspective view diagrammatically illustrating the two comb-like members of the side-section of Figure 7 when unassembled, to more clearly show their construction and the method of attaching them together.

Figure 9 is a perspective view of the comb-like members of Figure 8 when assembled ready for winding the slat material.

Figure 10 is an elevational view, diagrammatically illustrating a hinged end-section which may be employed according to a modification of the present invention for increasing the ease of assemblage and winding of the flexible slat material.

Figure 11 is a plan or top view, partly in cross-section, showing two positions of the hinged end-section of Figure 10; the open position shown being employed when winding the flexible slat material, and the closed position shown being employed after winding to obtain the required rigidity of the frame and tension on the slat material.

Figure 1:
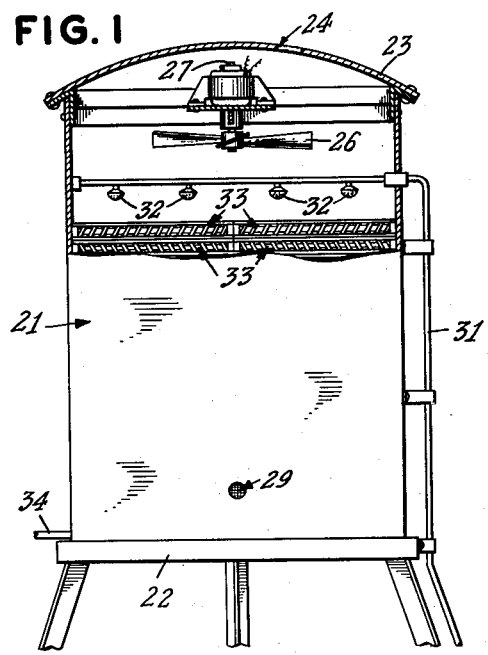

In Figure 1, a quadrangular shaped vessel or cooling tank 21 is mounted upon a base or pedestal 22. A cover 23 having an outlet 24 for discharge of vapors is superimposed by suitable means on vessel 21. A fan 26 is attached to the shaft of a motor 27, which is mounted upon a cross-bar or other supporting means attached to the sides of the upper portion of the vessel 21. Vessel 21 is also provided with an inlet or opening 29 at the lower portion thereof for the intake of gas, such as air, which is drawn upwardly by the suction of fan 26. A conduit 31 is provided for introducing liquid into the top of vessel 21. Nozzles 32, or other conventional means for spraying liquid downwardly in vessel 21, are attached to conduit 31. A plurality of improved baffle trays 33 of the present invention are superimposed upon each other in vessel 21 below nozzles 32. An outlet conduit 34 is provided at the bottom of vessel 21 for the removal of liquid accumulating in the bottom of vessel 21.

In the preferred embodiment of the present invention, the apparatus of Figure 1 is employed for the cooling of water with air. In conventional air conditioning and cooling systems, water at a temperature of about 125 to 150° F. is passed through conduit 31 to nozzles 32. The water is sprayed over the upper baffle tray in vessel 21 and flows downwardly over the plurality of successive baffle trays to the bottom of vessel 21. Air at atmospheric temperature entering vessel 21 through inlet 29 is sucked upwardly through vessel 21 in countercurrent contact with the water. Air is vented from vessel 21 through outlet 24 in cover 23. Water, cooled to slightly above atmospheric temperature, is removed from the bottom of vessel 21 through outlet conduit 34.

Figure 2:
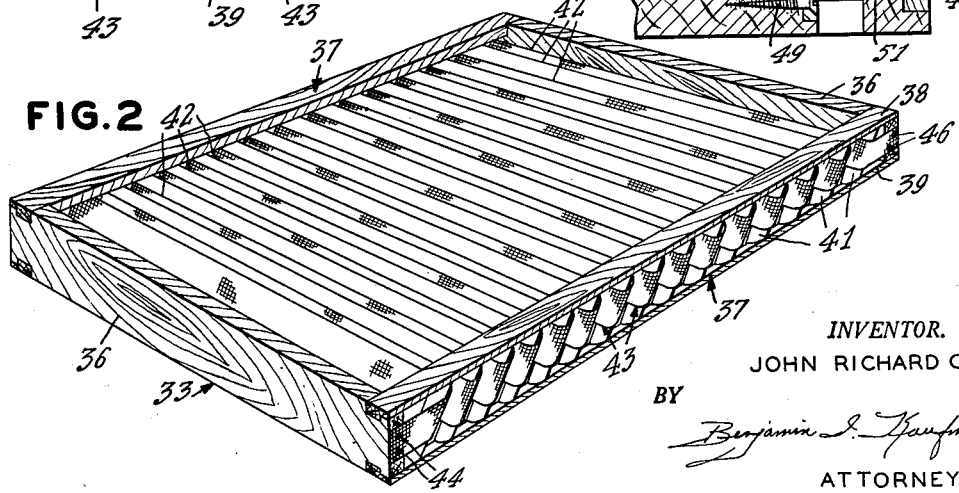

The baffle tray 33 of Figure 1 of the drawings is of an improved and novel construction which is shown in detail in Figure 2. The baffle tray of Figure 2 comprises a rectangular frame having oppositely disposed end-sections 36 and side-sections 37. Although the frame of baffle tray 33 is shown as rectangular the shape may be square, or any polyangular shape without departing from the scope of this invention. End-sections 36 and side-sections 37 are made of any suitable rigid material such as wood, metal or plastic, with wood being preferred in the present embodiment. Thus sections 36 and 37 may consist of ⅞ inch soft wood or other woods of varying hardness and thickness, depending upon the requirements for the purpose to which the baffle tray may be subjected. Side-sections 37 comprise upper and lower parallel side-rails 38 and 39 which are separated by obliquely disposed substantially parallel struts 41 secured to side-rails 38 and 39 in an overlapping spaced relationship to each other. These struts are constructed preferably of ⅞ inch half-round moulding and are positioned with respect to side-rails 38 and 39 at an angle which may vary between about 20 and about 45 degrees, with an angle of about 30 degrees being preferred. The cross-section of struts 41 may be any desired shape, such as square, rectangular, hexagonal, circular, etc. and may be made of various types of construction material. A contiguous strip of flexible tape 42 is fixed at its ends to the end-sections or side-sections of the frame of the baffle tray and is transversely wound from side-section to side-section around corresponding cylindrical struts or spacing members 41, as illustrated by numeral 43 and more specifically shown by Figure 3, to form a series of angularly disposed substantially parallel slats. This contiguous strip of tape may be made of any flexible material which can be adapted for the aforementioned traverse winding from side-section to side-section without causing any destruction or weakening of the material itself. Hence tape 42 may comprise a metal tape, such as steel, plastic tape, a fibrous or woven material, such as canvas, woven glass fibre or plastic filaments or threads. In its preferred form tape 42 comprises a woven resilient plastic filament, as is more specifically illustrated and described in the discussion hereinafter of Figure 4. Numerals 44 and 46 indicate nails or screws for fastening the ends of tape 42 to end-sections 36.

Figure 3:
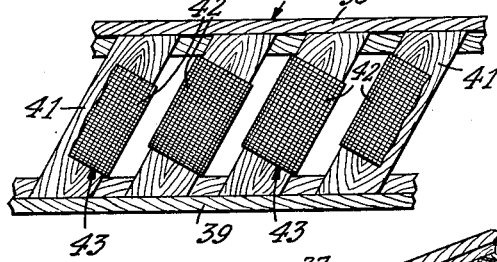
Figure 3 is a fragmentary elevational view diagrammatically illustrating a side-section 37 of the improved baffle tray of Figure 2 of the drawing.

In the fragmentary elevational view of side-section 37 in Figure 3, is shown an enlarged view of the winding of tape 42 around spacing members or struts 41 which are substantially parallel to each other and angularly disposed to side-rails 38 and 39, as described in the above discussion of Figure 2. It will be noted that there is an overlapping of the upper portion of tape 42 over the lower portion of the tape which comprises the next succeeding slat.

Figure 4:
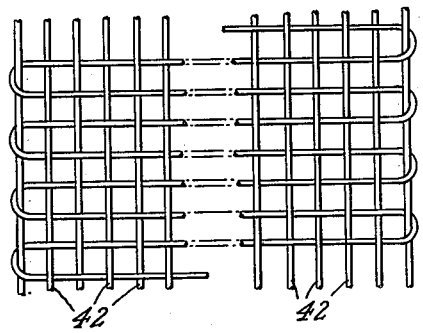
Figure 4 is a view diagrammatically illustrating the slat material comprising a woven fabric according to one modification of this invention.

In Figure 4 is shown an enlarged plan view of the construction of tape 42 which comprises the slats of the improved baffle tray of the present invention. As previously indicated, it is preferred that tape 42 comprise a resilient woven material, such as a woven plastic filament whose chemical composition is such that it is non-reactive with gases and liquids that are to be cooled, and one which will retain its resiliency at the temperature to which it is subjected during the cooling of liquids or gases. Accordingly, tape 42 may be woven of a plastic filament or a filament coated with a plastic such as Saran, which is for the most part a vinylidene chloride copolymer specifically consisting of copolymers of approximately 90% vinylidene chloride and 10% vinyl chloride. Such woven material is particularly desirable for the slat construction of the present improved baffle tray, inasmuch as slats constructed of such woven material have been found not to support combustion and are classified as incombustible. It will be understood, however, that various other plastic materials or plastic filaments possessing similar characteristics, may also be successfully employed in the construction of the aforementioned tape without departing from the scope of this invention. It is preferred that tape 42 have a width varying between about 1 inch to 3 inches, with a width of approximately 1.5 inches being most desirable. The filament or thread comprising the weave of tape 42 may vary from approximately .005 to .03 inch in thickness, with a filament thickness of .015 inch being preferred. The weave of filament 42 may be a close weave or a highly open weave, depending upon the use and conditions to which the tape is to be subjected. It is generally preferable, however, that the mesh or weave of tape 42 vary not more than between about 8 and about 30 strands per inch. In this respect it will be noted that it is desirable that the mesh of the tape be of such size (e. g. within the limits indicated above) that liquid flowing over the slats of the baffle tray, comprised of tape 42, will not pass through the interstices but will flow over the surface of the slat onto the surface of the next succeeding slat. A tape having a construction such as the woven material described above, is an important feature of the present invention, inasmuch as the retention of liquid on the slat surfaces and the resulting successive flow of liquid from slat to slat rather than through the interstices of the slats, makes possible increased contact between liquid and gas by reason that the gas may pass not only through the spaces between the slats themselves, but also through the interstices of the slat material. It is preferred that the mesh of the tape be as large as possible without the possibility of the liquid passing through the interstices instead of over the surface of the slat. The selection of a suitable mesh size will depend upon such factors as, composition of the liquid to be treated, wettability of the slat material with the liquid employed, and rate of flow of the gas upwardly through the baffle tray. It will also be understood that the desired resiliency of tape 42 which comprises the slats of the improved baffle tray will vary as the mesh or weave of the tape is increased or decreased. In the actual weaving of tape 42 any of the conventional methods known to those skilled in the art may be employed. It is preferred, however, that a straight weave be employed and that the tape be finished in such a manner that it will not tend to ravel at the edges, thus impairing its efficiency. If so desired it is also possible in using plastic filaments of the type hereinbefore mentioned for the construction of tape 42, to incorporate in the plastic mass prior to filament formation, various conventional chemical compounds which are known to act as vermin repellants, such as fluorides, arsenates and the like. The utilization of the woven tape, which comprises the slats of the improved baffle tray of the present invention, incorporating such vermin repellants, constitutes an additional attractive feature for slats of this construction, inasmuch as attacks by rodents upon the slats of baffle trays previously utilized in industry have presented a serious problem.

Figure 5:
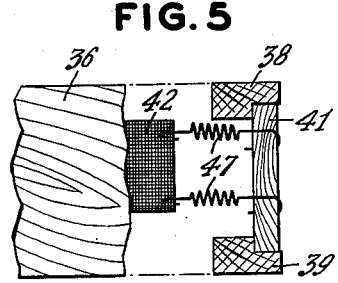
Figure 5 is an elevational view, partly in cross-section, diagrammatically illustrating one means for attaching the flexible slat material to the frame of the baffle tray.

As indicated above, tape 42 is fixed at its ends to any portion of the end-sections or side-sections comprising the frame of the baffle tray. In Figure 5 is shown an elevational view partly in cross-section illustrating one modification of means for attaching and maintaining constant tension on tape 42. One end of tape 42 is fixed to one end of a conventional set of springs 47, the other end of springs 47 being fixed to a strut or spacing member 41. It should be noted, however, that the ends of springs 47 need not necessarily be attached to strut 41, but if so desired may be attached to any portion of the frame such as end-sections 36 or side-rails 38 and 39 comprising side-section 37. This method for attaching and maintaining constant tension on tape 42, is preferred wherein the tape comprises a non-resilient material.

Figure 6:
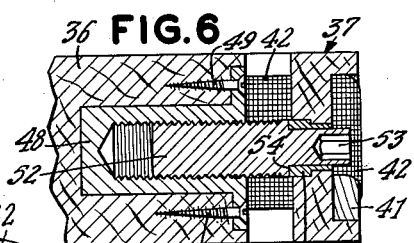
Figure 6 is an elevational view, partly in cross-section, diagrammatically illustrating, according to another modification of the invention, means for obtaining tension on the slat material of the baffle tray.

In Figure 6 is shown an elevation view partly in cross-section diagrammatically illustrating another modification of means for maintaining constant tension on the slats comprising tape 42 of the improved baffle tray. An internally threaded insert 48 is retained in an end-section 36 by screws 49. A threaded stud 52, having a sleeve 51 and a shoulder 54 and a hexagonal hole 53 for turning stud 52, is retained in a side-section 37 and is adapted to engage internally threaded insert 48. By proper adjustment of stud 52 with a suitable instrument inserted in hole 53 it is possible to vary the tension on the slats comprising tape 42, and thus maintain the desired tension on these slats. It will be noted that in the modification illustrated by Figure 6, tape 42 may be either a resilient or non-resilient material.

In Figure 7 is shown an elevation view illustrating another modification of the construction of a side-section of the improved baffle tray. This side-section consists of a pair of comb-like members 61 and 63, containing a plurality of substantially parallel teeth obliquely disposed to the base of comb-like members 61 and 63 and represented by numerals 62 and 64 respectively. Comb-like members 61 and 63 are assembled diametrically disposed to each other as shown in Figure 7 and are fastened to each other and to the end-sections of the frame by means of fastening pins or dowels 67 or other conventional fastening means and held in place by the tension of the tape wound around them. Numeral 66 in Figure 7 illustrates the tape wound around the above mentioned teeth. Numeral 68 represents holes or openings through which dowels or fastening pins will fit when comb-like members 61 and 63 are assembled, and which will be described in connection with the description of Figure 8. Particular advantage is attained in employing a baffle tray constructed in accordance with the modification in Figure 7. The frame of the baffle tray may be constructed of, or moulded of, plastic, as an integrated unit, without the necessity of conventional bolting, nailing or other fastening means, the entire frame being held together by the tension of the tape thereon, as indicated above. While it is preferred that the frame be constructed of plastic, other construction materials may also be utilized, such as wood, aluminum, etc.

In Figure 8 is shown a more detailed perspective view of comb-like members 61 and 63 when unassembled, while in Figure 9 is shown a more detailed perspective view of comb-like members 61 and 63 as assembled ready for winding the slat material and comprising the side-section in Figure 7, above, of the improved baffle tray. Some of the parts comprising comb-like members 61 and 63 in Figures 8 and 9 have been covered in the description of Figure 7 above and are therefore deemed self-explanatory as shown. Comb-like members 61 and 63 also are composed of flanges 73 and 74 in comb-like member 63, and flanges 76 and 77 in comb-like member 61. Flange 77 also bears attaching pins or dowels 67, and flange 73 contains holes or openings 69 which will align with pins 67 when comb-like members 61 and 63 are assembled, as indicated in Figure 9. When assembled, pins 67 will fit into holes 69. Teeth 62 in comb-like member 61 contain dowels or fastening pins 72. Teeth 64 in comb-like member 63 contain dowels or fastening pins 71. Both comb-like members 61 and 63 contain holes or openings 68 and 70, respectively, into which corresponding pins 71 and 72 will fit when the comb-like members are assembled, as shown in Figure 9. It should be noted that comb-like members 61 and 63 may also be fabricated as one piece, if so desired, and thus form the side-section of the improved baffle tray.

In Figure 10 is shown an elevational view, diagrammatically illustrating a hinged end-section which may be employed according to another modification of the present invention, particularly adaptable to the model including comb-like members as shown in Figures 7, 8, and 9 for creating tension on the slats of the improved baffle tray. End-section 78 is divided at the mid-point, and a hinge 79 is fastened on one surface of the end-section to each of the two parts comprising end-section 78. In dividing end-section 78 at the mid-point, the bisection is so made that the angle formed by the intersection of the longitudinal axis of the end-section and the line of bisection is approximately 92°. On the other surface of end-section 78 is fastened a catch or other locking means 81, so that end-section 78 may be maintained rigid at all times when in a closed position. The length of the tape comprising the slats of the baffle tray is so set that when end-section 78 is in a closed position with catch 81 in the locking position the ultimate desired tension on the slats is attained. Particular advantage is attained in utilizing an end-section fabricated in accordance with the above-mentioned modification of the invention, inasmuch as a predetermined and prefixed length of tape can be loosely wound through the spacing members in the side-sections of the frame of the baffle tray, without maintaining constant tension while winding the tape, and the ultimate desired tension on the slats being attained when the end-section is in a locked position, by reason of the aforementioned angular cut taken in the bisection of the end-section.

In Figure 11 is shown a plan or top view partly in cross-section similar to Figure 10, illustrating the operation of end-section 78 and hinge 79 when in both an open or unlocked position employed when winding the flexible slat material, and in a closed or locked position after winding to obtain the required rigidity of the frame and tension on the slat material. It will be noted in this respect that end-section 78 has a recess at each end represented by numeral 82 which engages pins 67 in flange 77 in order to keep end-section 78 fixed to the side-rails of the frame when in a closed or locked position. It will be noted that the type of end-section shown in Figures 10 and 11 can be used with any model of the frame of the baffle tray, such as is shown in the modification in Figure 2 of the drawing.

From the foregoing description of the improved baffle tray of the present invention, it will be apparent that the undesirable features heretofore encountered in conventional baffle trays having slats made of solid, rigid materials and individually fixed to the baffle tray frame, have been eliminated. Thus it will be noted that in employing a tape, having a construction such as the woven material hereinbefore described and comprising the slats of the improved baffle tray, far greater contact surface between liquids and gases is effected than can be obtained with conventional equipment. The ability of the slats to retain liquid on the slat surfaces, makes possible the above-mentioned increased contact between liquid and gas, inasmuch as the gas passes not only through the spaces between the slats themselves, but also through the interstices of the slat material. This ability of the gas to pass through the interstices of the slat material, results in a saving of power requirements of fans or blowers in sucking gases upwardly for contact with the liquid, over the power required when employing conventional baffle trays.

Other advantages that are obtained in utilizing the improved baffle tray of the present invention, lie in the ease of fabrication and economies of construction. Thus, it is far easier to wind the tape or flexible material, comprising the slats of the present invention, around corresponding spacing members in the frame of the baffle tray, than it would be to insert individual rigid slats, each of which must be separately cut or formed and individually fastened to the frame of the baffle tray, as has heretofore been the practice in fabricating conventional equipment. The resulting saving in labor constructions costs as well as the difference in the cost of respective materials, will also become at once apparent.

Still other advantages are realized in utilizing the improved baffle tray of the present invention. The relative lightness of the present slat material as compared to the conventional wood or metal slats, results in savings in cost of transportation of the baffle tray as compared with the cost of transporting far heavier conventional equipment. In addition, this saving in cost of transportation may be still further increased, where the frame itself of the present improved baffle tray is constructed of plastic materials. Further advantages are also realized in employing the tape or flexible resilient material comprising the slats of the baffle tray of the present invention, as compared to conventional rigid wood or metal slats, inasmuch as the susceptibility of the slats being bent or broken in shipping or in actual use, is entirely eliminated. Apart from the above, it will be apparent that when the improved baffle trays of the present invention are employed in systems utilizing such liquids as water, the danger of the slats becoming warped or swollen and thus rendering the trays unsuitable for use, is a factor no longer to be considered.

Various other modifications of the improved baffle tray of the present invention may become apparent to one skilled in the art without departing from the scope of the invention.

Having thus described my invention, I claim:

1. A baffle tray which comprises in combination: an open-faced frame having oppositely disposed side-sections and end-sections, said side-sections comprising side-rails separated by obliquely disposed substantially parallel cylindrical struts secured to said rails and in an overlapping spaced relationship to each other, one of said end-sections being hinged in the middle portion thereof; and a contiguous strip of tape comprising a woven resilient filament fixed at its ends to said frame and transversely wound from side-section to side-section around corresponding struts of said side-sections to form a series of overlapping angularly disposed elongated slats substantially parallel to each other.

2. A baffle tray which comprises in combination: an open-faced frame having oppositely disposed side-sections, each of said side-sections comprising a pair of comb-like members diametrically disposed to each other and containing a plurality of substantially parallel teeth obliquely disposed to the base of said comb-like members; a series of overlapping angularly disposed elongated slats substantially parallel to each other consisting of a contiguous strip of flexible tape fixed at its ends and transversely wound from side-section to side-section and supported by corresponding teeth of said comb-like members; and means for moving said comb-like members longitudinally with respect to each other to spread cooperating pairs in order to tension said strip of flexible tape.

3. A baffle tray which comprises in combination: an open-faced frame having oppositely disposed side-sections and end-sections, said side-sections comprising side-rails separated by substantially parallel struts secured to said rails and disposed at an angle of about 30 degrees in an overlapping spaced relationship to each other; a series of overlapping angularly disposed substantially parallel elongated slats consisting of a contiguous perforated strip of tape approximately 1.5 inches wide comprising a woven filament of a vinylidene chloride copolymer fixed at its ends to said frame and transversely wound from side-section to side-section and supported by corresponding struts of said side-sections; and means for adjusting at least one of said sections of said frame relative to the remainder of said frame whereby tension on said strip of tape may be adjusted.

4. In a gas-liquid contact system comprising a vessel having a plurality of superimposed baffle trays, a blower for passing a gas upwardly through said baffle trays, and means for introducing liquid into the upper portion of said vessel whereby the liquid flows downwardly over said baffle trays in intimate countercurrent contact with said gas, the improvement in the construction of said baffle trays which comprises in combination: an open-faced frame having oppositely disposed side-sections and end-sections, said side-sections containing a plurality of angularly disposed substantially parallel spacing members; a series of angularly disposed substantially parallel elongated slats consisting of a contiguous perforated strip of tape comprising a woven resilient filament fixed at its ends to said frame and transversely wound from side-section to side-section and supported by corresponding spacing members; and means for adjusting at least one of said sections of said frame whereby tension on said strip of tape may be adjusted.

5. In a gas-liquid contact system comprising a vessel having a plurality of superimposed baffle trays, a blower for passing a gas upwardly through said baffle trays, and means for introducing liquid into the upper portion of said vessel whereby the liquid flows downwardly over said baffle trays in intimate countercurrent contact with said gas, the improvement in the construction of said baffle trays which comprises in combination: an open-faced frame having oppositely disposed side-sections and end-sections, said side-sections comprising side-rails separated by obliquely disposed substantially parallel cylindrical struts secured to said rails and in an overlapping spaced relationship to each other, one of said end-sections being hinged in the middle portion thereof; and a contiguous strip of tape comprising a woven resilient filament fixed at its ends to said frame and transversely wound from side-section to side-section around corresponding struts of said side-sections, to form a series of overlapping elongated slats substantially parallel to each other and obliquely disposed with respect to the face of said frame.

6. A baffle tray which comprises in combination: an open-faced frame having oppositely disposed side-sections and end-sections, said side-sections containing a plurality of angularly disposed substantially parallel spacing members; a series of substantially parallel elongated slats consisting of a contiguous strip of flexible tape transversely wound from side-section to side-section and supported by corresponding spacing members; and means for adjusting at least one of said sections of said frame relative to the remainder of said frame whereby tension on said strip of flexible tape may be adjusted.

7. A baffle tray which comprises in combination: an open-faced frame having oppositely disposed side-sections and end-sections, said side-sections containing a plurality of angularly disposed substantially parallel spacing members; a series of substantially parallel elongated slats consisting of a contiguous strip of flexible tape transversely wound from side-section to side-section and supported by corresponding members; and means for adjusting one of said end-sections of said frame relative to the remainder of said frame whereby tension on said strip of flexible tape may be adjusted.

8. A baffle tray which comprises in combination: an open-faced frame having oppositely disposed side-sections and end-sections, said side-sections comprising side-rails separated by obliquely disposed substantially parallel cylindrical struts secured to said rails and in an overlapping spaced relationship to each other; a series of overlapping angularly disposed elongated slats substantially parallel to each other consisting of a contiguous strip of flexible resilient tape transversely wound from side-section to side-section and supported by corresponding struts of said side-sections; an internally threaded insert retained in an end-section, and a shouldered threaded stud retained in a side-section adapted to engage said internally threaded insert whereby tension on said strip of flexible resilient tape may be adjusted.

JOHN RICHARD CAVE.

References Cited in the file of this patent

UNITED STATES PATENTS

| Number | Name | Date |
|---|---|---|
| 844,336 | Doherty | Feb. 19, 1907 |
| 872,330 | Cunningham | Dec. 3, 1907 |
| 930,561 | Rahe | Aug. 10, 1909 |
| 1,339,105 | Cox | May 4, 1920 |
| 1,928,912 | Scherer et al. | Oct. 3, 1933 |
| 1,944,407 | Dahlman | Jan. 23, 1934 |
| 1,973,233 | Thousand | Sept. 11, 1934 |
| 2,132,939 | Elmer | Oct. 11, 1938 |
| 2,299,920 | Moore | Oct. 27, 1942 |

FOREIGN PATENTS

| Number | Country | Date |
|---|---|---|
| 23,287 | Great Britain | Feb. 25, 1915 |